(12) United States Patent
Hirai et al.

(10) Patent No.: US 11,494,029 B2
(45) Date of Patent: Nov. 8, 2022

(54) DISPLAY SYSTEM, CONTROL DEVICE, AND CONTROL METHOD

(71) Applicant: Panasonic Intellectual Property Management Co., Ltd., Osaka (JP)

(72) Inventors: Atsushi Hirai, Tokyo (JP); Yuji Hashimoto, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 17/377,646

(22) Filed: Jul. 16, 2021

(65) Prior Publication Data
US 2021/0342054 A1 Nov. 4, 2021

Related U.S. Application Data

(63) Continuation of application No. PCT/JP2020/006975, filed on Feb. 21, 2020.

(30) Foreign Application Priority Data

Mar. 27, 2019 (JP) .............................. JP2019-060319

(51) Int. Cl.
*G06F 3/041* (2006.01)
*G02F 1/1333* (2006.01)
*G02F 1/1343* (2006.01)

(52) U.S. Cl.
CPC ...... *G06F 3/04164* (2019.05); *G02F 1/13338* (2013.01); *G02F 1/134363* (2013.01); *G06F 3/0412* (2013.01)

(58) Field of Classification Search
CPC combination set(s) only.
See application file for complete search history.

(56) References Cited

U.S. PATENT DOCUMENTS 7,209,111 B2 4/2007 Kurokawa et al.
7,834,835 B2 11/2010 Kurokawa et al.
(Continued)

FOREIGN PATENT DOCUMENTS

| JP | 2004-029540 | 1/2004 |
| JP | 2018-180954 | 11/2018 |
| WO | 2018/123813 | 7/2018 |

OTHER PUBLICATIONS

International Search Report (ISR) from International Searching Authority (Japan Patent Office) in International Pat. Appl. No. PCT/JP2020/006975, dated May 12, 2020, along with an English language translation.

*Primary Examiner* — Robin J Mishler
(74) *Attorney, Agent, or Firm* — Greenblum & Bernstein, P.L.C.

(57) ABSTRACT

In a display system, a source drive circuit outputs a source signal. Multiple switching elements are respectively connected between multiple source lines and the source drive circuit, and each switching element outputs a source signal output from the source drive circuit to a source line in an ON state and stops the output of the source signal to the source line in an OFF state. A switching circuit supplies multiple pulse signals to the multiple switching elements. A CPU determines pulse widths of the multiple pulse signals. The pulse widths of the multiple pulse signals are determined such that each of the pulse widths of the multiple pulse signals is longer than or equal to a charging time of a pixel electrode and such that the sum of the pulse widths of the multiple pulse signals is shorter than or equal to a horizontal synchronization period.

10 Claims, 14 Drawing Sheets

(56) References Cited

U.S. PATENT DOCUMENTS

| | | | |
|---|---|---|---|
| 8,330,688 B2 | 12/2012 | Kurokawa et al. | |
| 8,619,009 B2 | 12/2013 | Kurokawa et al. | |
| 9,035,977 B2 | 5/2015 | Kurokawa et al. | |
| 10,592,029 B2 | 3/2020 | Takada et al. | |
| 2004/0012581 A1* | 1/2004 | Kurokawa | G09G 3/2014 345/204 |
| 2007/0176880 A1 | 8/2007 | Kurokawa et al. | |
| 2011/0267386 A1 | 11/2011 | Kurokawa et al. | |
| 2013/0127695 A1 | 5/2013 | Kurokawa et al. | |
| 2014/0125716 A1 | 5/2014 | Kurokawa et al. | |
| 2018/0059838 A1* | 3/2018 | Chung | G06F 3/0443 |
| 2018/0300000 A1 | 10/2018 | Takada et al. | |
| 2021/0166628 A1* | 6/2021 | Huang | G09G 3/3258 |

\* cited by examiner

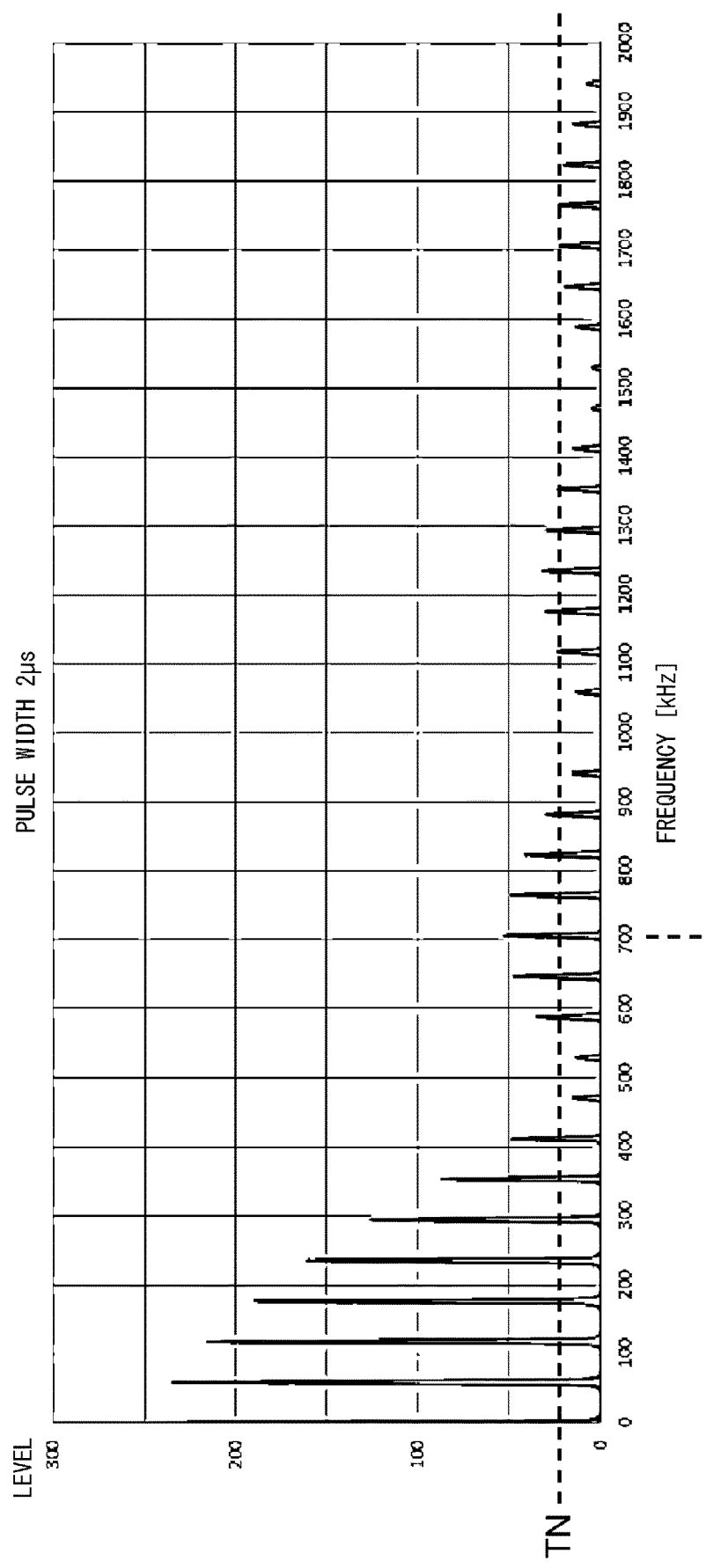

DISPLAY SYSTEM, CONTROL DEVICE, AND CONTROL METHOD

CROSS-REFERENCE TO RELATED APPLICATIONS

This application is a Continuation of International Application No. PCT/JP2020/006975, filed on Feb. 21, 2020, which in turn claims the benefit of Japanese Application No 2019-060319, filed on Mar. 27, 2019, the disclosures of which Applications are incorporated by reference herein.

BACKGROUND

1. Field

The present disclosure relates to a display system provided with a touch detection function, a control device, and a control method.

2. Description of The Related Art

An in-cell display device, in which a touch sensor for detecting a user's touch position is built into a display panel, is known (see Patent Literature 1, for example). In such a display device, a common electrode used to supply a common voltage to each pixel of a liquid crystal display panel is divided into multiple common electrodes, which are also used as touch sensor electrodes. During an image display period, a common voltage is supplied to each of the multiple common electrodes, and, during a touch detection period, a touch drive signal for touch detection is supplied to each of the multiple common electrodes.

[Patent Literature 1] WO 2018/123813

SUMMARY

For in-cell display systems, further improvement has been required.

To solve the problem above, a display system according to one aspect of the present disclosure includes: a display device including multiple gate lines, multiple source lines, multiple pixel electrodes provided respectively in regions defined by the multiple gate lines and the multiple source lines, and multiple common electrodes provided to face the multiple pixel electrodes and used for both image display and touch detection; a source drive circuit that outputs a source signal; multiple switching elements that are respectively connected between the multiple source lines and the source drive circuit and that each output the source signal output from the source drive circuit to a source line in an ON state and each stop the output of the source signal to the source line in an OFF state; a switching circuit that supplies multiple pulse signals to the multiple switching elements; and a control device that controls the switching circuit. For each group including multiple switching elements, the switching circuit supplies the multiple pulse signals respectively to the switching elements included in the group, and a pulse width of each of the multiple pulse signals defines ON time of the switching element supplied with the pulse signal. The control device includes a determination unit that determines pulse widths of the multiple pulse signals. The pulse widths of the multiple pulse signals are determined such that each of the pulse widths of the multiple pulse signals is longer than or equal to a charging time of a pixel electrode and such that the sum of the pulse widths of the multiple pulse signals is shorter than or equal to a horizontal synchronization period.

Another aspect of the present disclosure is a control device. The control device is provided in a display system that includes: a display device including multiple gate lines, multiple source lines, multiple pixel electrodes provided respectively in regions defined by the multiple gate lines and the multiple source lines, and multiple common electrodes provided to face the multiple pixel electrodes and used for both image display and touch detection; a source drive circuit that outputs a source signal; multiple switching elements that are respectively connected between the multiple source lines and the source drive circuit and that each output the source signal output from the source drive circuit to a source line in an ON state and each stop the output of the source signal to the source line in an OFF state; and a switching circuit that supplies multiple pulse signals to the multiple switching elements. The switching circuit supplies, for each group including multiple switching elements, the multiple pulse signals respectively to the switching elements included in the group. The control device includes a determination unit that determines pulse widths of the multiple pulse signals. The pulse widths of the multiple pulse signals are determined such that each of the pulse widths of the multiple pulse signals is longer than or equal to a charging time of a pixel electrode and such that the sum of the pulse widths of the multiple pulse signals is shorter than or equal to a horizontal synchronization period.

Yet another aspect of the present disclosure is a control method. The control method is used in a display system that includes: a display device including multiple gate lines, multiple source lines, multiple pixel electrodes provided respectively in regions defined by the multiple gate lines and the multiple source lines, and multiple common electrodes provided to face the multiple pixel electrodes and used for both image display and touch detection; a source drive circuit that outputs a source signal; multiple switching elements that are respectively connected between the multiple source lines and the source drive circuit and that each output the source signal output from the source drive circuit to a source line in an ON state and each stop the output of the source signal to the source line in an OFF state; and a switching circuit that supplies multiple pulse signals to the multiple switching elements. The switching circuit supplies, for each group including multiple switching elements, the multiple pulse signals respectively to the switching elements included in the group. The control method includes determining pulse widths of the multiple pulse signals. The pulse widths of the multiple pulse signals are determined such that each of the pulse widths of the multiple pulse signals is longer than or equal to a charging time of a pixel electrode and such that the sum of the pulse widths of the multiple pulse signals is shorter than or equal to a horizontal synchronization period.

BRIEF DESCRIPTION OF DRAWINGS

Embodiments will now be described, by way of example only, with reference to the accompanying drawings which are meant to be exemplary, not limiting, and wherein like elements are numbered alike in several Figures, in which:

FIGS. 8A-8C are diagrams that respectively show frequency components of the pulse signals shown in FIGS. 7A-7C;

DETAILED DESCRIPTION

Figure 1:
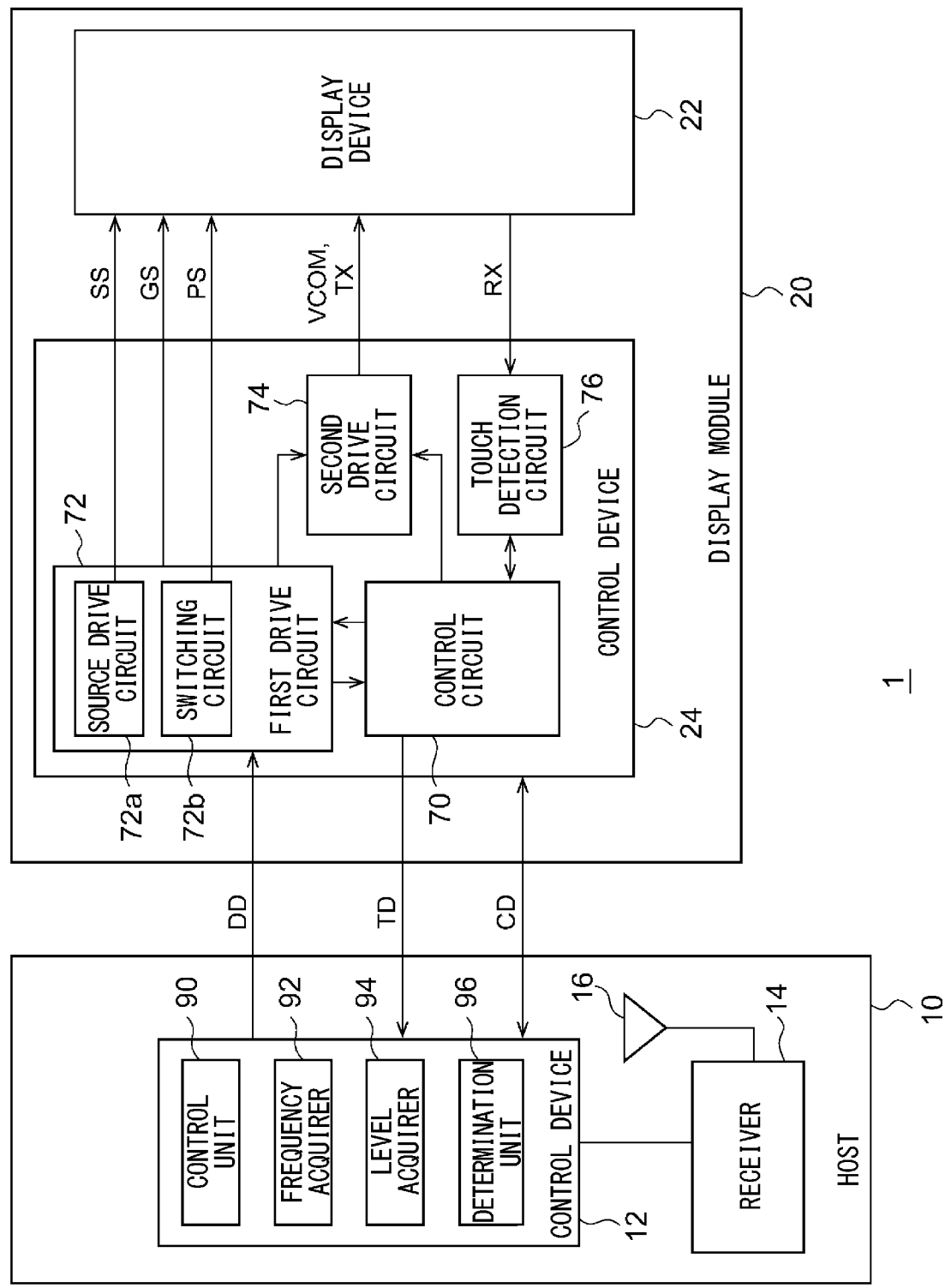
FIG. 1 is a block diagram of a display system according to a first embodiment.

The invention will now be described by reference to the preferred embodiments. This does not intend to limit the scope of the present invention, but to exemplify the invention.

Base Findings of Present Disclosure

Before specific description of embodiments is given, the base findings will be described. In an in-cell touch display, a thin-film transistor is disposed in each pixel and made of amorphous silicon (a-Si) or low temperature polycrystalline silicon (LTPS). An LTPS transistor can respond faster than an a-Si transistor. Accordingly, multiple multiplexers constituted by LTPS transistors may be arranged in a display such that each multiplexer selects one of multiple source lines, so that a source signal output from one source driver can be supplied to the selected source line. This can reduce the number of source drivers, compared to the case where a source driver is provided for each source line.

In an in-cell touch display, electrodes are not provided on the side closer to the viewer than the common electrodes. Accordingly, an in-cell touch display is more likely to radiate noise than an out-cell display device, in which touch sensor electrodes are arranged on the side closer to the viewer than the common electrodes. Therefore, the inventors have found a problem that radiated noise caused by pulse signals for switching the multiplexers may affect the reception of wireless signals at a receiver near the display. The amount of noise radiation can be reduced by providing a transparent electrode for shielding on the side closer to the viewer than the common electrodes; however, accuracy and sensitivity of touch position detection may be degraded. To solve the problem, a display system according to the present disclosure is configured as described below.

Like reference characters denote like or corresponding constituting elements, members, and processes in each drawing, and repetitive description will be omitted as appropriate. Also, the dimensions of a member may be appropriately enlarged or reduced in each drawing in order to facilitate understanding.

First Embodiment

FIG. 1 is a block diagram of a display system 1 according to the first embodiment. Although an example will be described in which the display system 1 is a vehicle-mounted display system 1 mounted on a vehicle, such as an automobile, the application is not particularly limited, and the display system 1 may also be used for a mobile device.

The display system 1 includes a host 10 and a display module 20. The host 10 performs various functions, such as radio, car navigation, and Bluetooth (registered trademark) communication, and controls the display module 20. The host 10 includes a control device 12, a receiver 14, and an antenna 16.

The control device 12 may be a CPU, for example, and also called a host CPU. The control device 12 controls the receiver 14. Also, the control device 12 supplies image data DD and control data CD to the display module 20 and controls the display module 20 based on such data.

The receiver 14 receives wireless signals via the antenna 16. The receiver 14 has at least one of the radio receiving function, GPS receiving function, or Bluetooth receiving function, for example.

The display module 20 includes a display device 22 and a control device 24. The display device 22 may be used as a center display on which a car navigation screen or the like is displayed within a vehicle cabin, for example.

The display device 22 is an in-cell liquid crystal display device of an in plane switching (IPS) type and configured as a touch display on which a touch position can be detected. The configuration of the display device 22 may be a well-known configuration as described below, for example.

Figure 2:
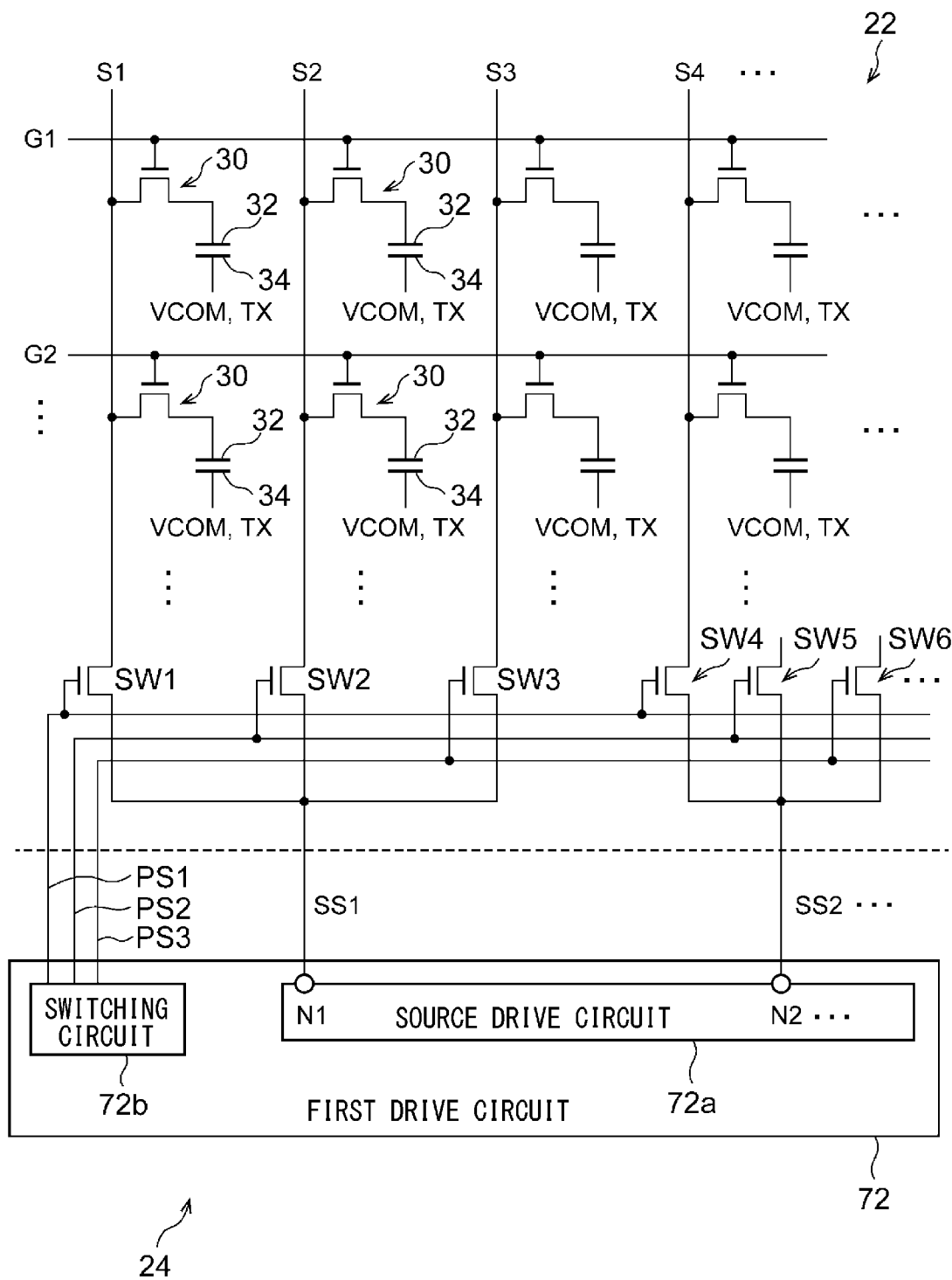
FIG. 2 is a diagram that schematically illustrates a circuit configuration of a display device shown in FIG. 1 and connections between the display device and a first drive circuit.

FIG. 2 schematically illustrates a circuit configuration of the display device 22 shown in FIG. 1 and connections between the display device 22 and a first drive circuit 72. FIG. 2 also shows schematic arrangement of constituting elements. The display device 22 includes multiple gate lines G1, G2, and so on extending in a row direction, multiple source lines S1, S2, S3, S4, and so on extending in a column direction, multiple pixel switching elements 30, multiple pixel electrodes 32, multiple common electrodes 34, and multiple switching elements SW1, SW2, SW3, SW4, and so on. In the following, when the switching elements SW1 and the like are not differentiated from each other, they may be referred to as switching elements SW.

Each pixel switching element 30 is a thin-film transistor provided near an intersection of a gate line and a source line such as to correspond to a pixel. The semiconductor layer of each pixel switching element 30 may be made of LTPS, for example. In each pixel switching element 30, the gate is connected with a gate line, the source is connected with a source line, and the drain is connected with a pixel electrode 32. For one common electrode 34, multiple pixel switching elements 30 and multiple pixel electrodes 32 are arranged. The liquid crystal layer is controlled by means of electric fields between pixel electrodes 32 and common electrodes 34. The common electrodes 34 are used for both image display and touch detection. Accordingly, the number of electrode layers can be reduced, so that the display device 22 can be made thinner.

An example will be described in which the multiple pixels are arranged such that red pixels, blue pixels, and green pixels are repeatedly provided in this order in a row direction. However, the arrangement is not particularly limited, and various well-known pixel arrays may be used.

The first drive circuit 72 of the control device 24 includes a source drive circuit 72a and a switching circuit 72b. The source drive circuit 72a outputs multiple source signals SS1, SS2, and so on through multiple output nodes N1, N2, and so on.

Between each of the multiple source lines and the source drive circuit 72a, a switching element SW is connected. The multiple source lines are respectively connected with one ends of the multiple switching elements SW on a one-to-one basis. The other ends of three switching elements SW are mutually connected with one output node of the source drive circuit 72a. Each switching element SW outputs a source signal SS output from the source drive circuit 72a to a source line in the ON state, and stops the output of the source signal SS to the source line in the OFF state. The switching elements SW may also be made of LTPS, for example.

The switching circuit 72b supplies pulse signals PS1, PS2, and PS3 respectively to the gates of multiple switching elements SW. For example, the pulse signal PS1 is provided for red pixels, the pulse signal PS2 is provided for blue pixels, and the pulse signal PS3 is provided for green pixels.

The switching elements SW1 through SW3 function as a multiplexer that selects one of the three source lines S1 through S3 based on the pulse signals PS1 through PS3 and supplies the source signal SS1 to the selected source line. Other switching elements SW4 and the like also function similarly. More specifically, a source signal SS output through one output node of the source drive circuit 72a is supplied to one of red pixel groups, blue pixel groups, and green pixel groups in a time-division manner. Accordingly, the source lines and the output nodes need not be connected on a one-to-one basis as described previously, and the number of output nodes can be reduced to one third. Therefore, the circuit size of the source drive circuit 72a and the number of wires between the control device 24 and the display device 22 can be reduced. Operations of the switching elements SW will be detailed later.

Figure 3:
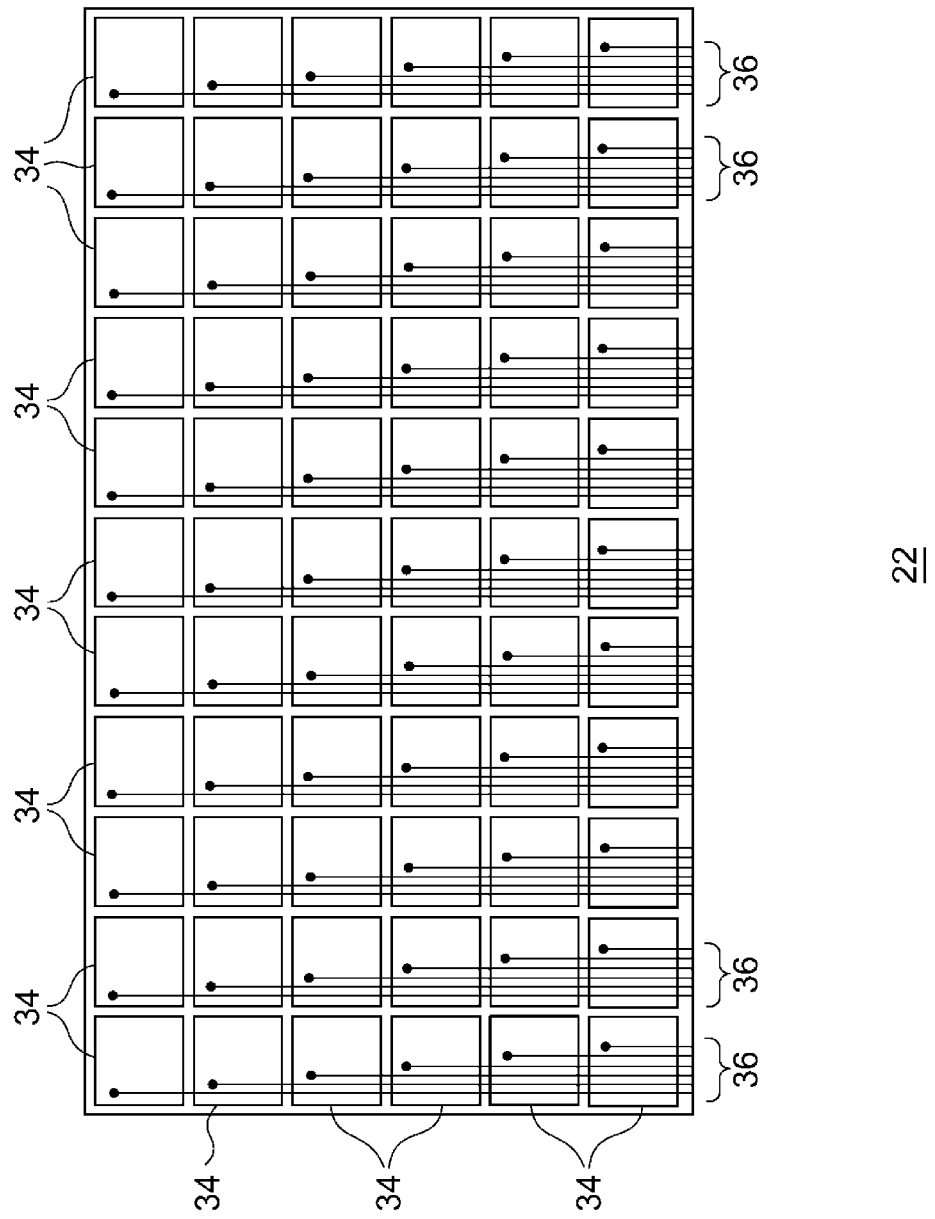
FIG. 3 is a top view that shows arrangement of common electrodes shown in FIG. 2.

FIG. 3 is a top view that shows arrangement of the common electrodes 34 shown in FIG. 2. The multiple common electrodes 34 are arranged in a matrix. Each common electrode 34 is connected to the control device 24 with a signal line 36.

The display device 22 detects a touch position based on the self-capacitance method. When a finger is brought closer to the display surface of the display device 22, capacitance is formed between a common electrode 34 and the finger. The formation of capacitance increases parasitic capacitance in the common electrode 34, so that the current flowing when a touch drive signal is supplied to the common electrode 34 is increased. Based on the current variation, the touch position is detected.

Figure 4:
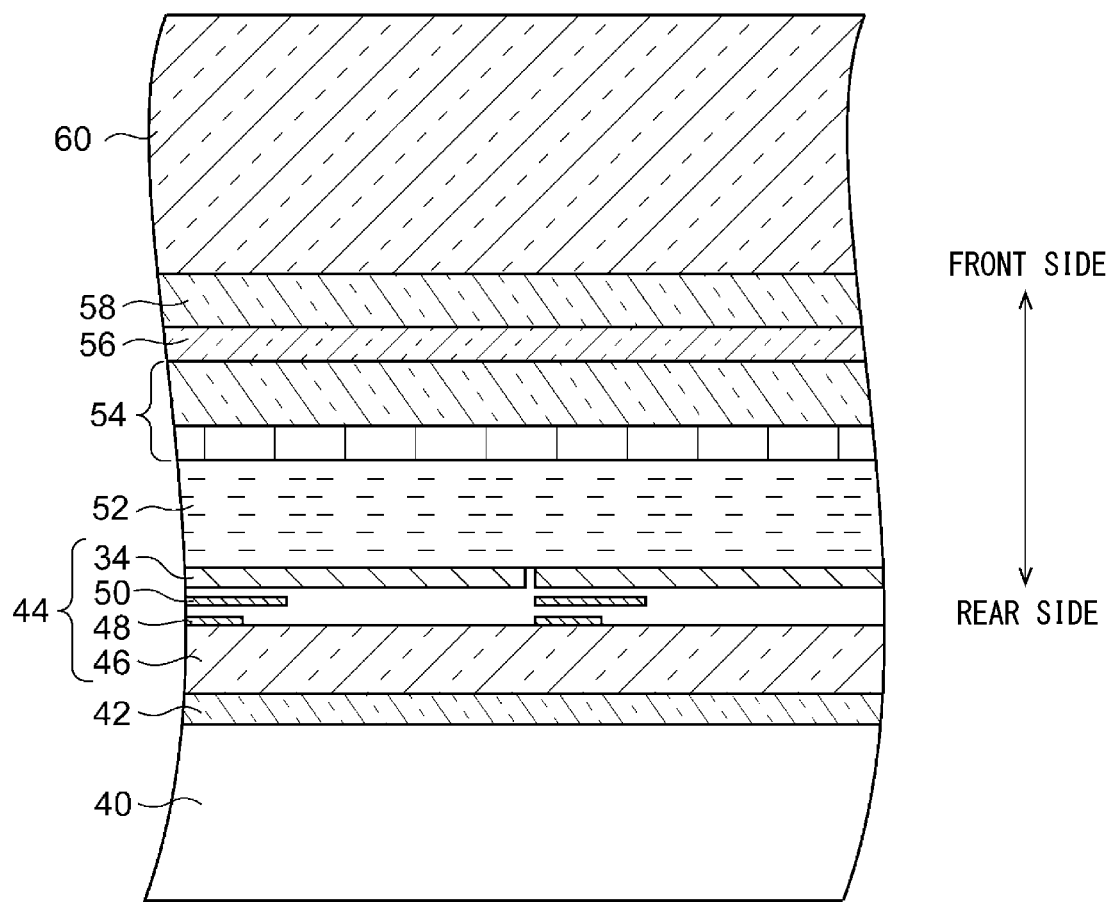
FIG. 4 is a longitudinal sectional view of the display device shown in FIG. 1.

FIG. 4 is a longitudinal sectional view of the display device 22 shown in FIG. 1. The display device 22 includes a backlight unit 40, a lower polarizer 42, a thin-film transistor substrate (hereinafter, referred to as a TFT substrate) 44, a liquid crystal layer 52, a color filter substrate 54, an upper polarizer 56, a bonding layer 58, and a protection layer 60, which are laminated and disposed in this order along a depth direction.

In the following, with regard to the depth directions of the display device 22, the side on which the protection layer 60 is positioned with respect to the TFT substrate 44 is defined as the front side, and the opposite side is defined as the rear side.

Using the light emitted from the backlight unit 40, the display device 22 emits image light toward the front side, or the viewer side.

The TFT substrate 44 includes a glass substrate 46 and also includes multiple gate electrodes 48, multiple source electrodes 50, and multiple common electrodes 34, which are arranged on the front side of the glass substrate 46. The TFT substrate 44 also includes the multiple gate lines G1, G2, and so on, the multiple source lines S1, S2, and so on, the multiple pixel electrodes 32, and the multiple pixel switching elements 30 shown in FIG. 2, though the illustration thereof is omitted. The liquid crystal layer 52 disposed on the front side of the TFT substrate 44 is controlled by means of lateral electric fields that occur between pixel electrodes 32 and common electrodes 34.

The bonding layer 58 has translucency and bonds the upper polarizer 56 and the protection layer 60. The bonding layer 58 may be formed by curing transparent resin in a liquid state, such as optically clear resin (OCR), or curing a transparent adhesive sheet, such as optically clear adhesive (OCA), for example.

The protection layer 60 is a layer that has translucency and protects the display device 22, and the protection layer 60 is constituted by a glass substrate or a plastic substrate, for example. The protection layer 60 is also called a cover lens, for example.

In the display device 22, electrodes are not provided on the front side of the common electrodes 34. Accordingly, as described previously, the display device 22 is more likely to radiate noise, such as harmonic components of pulse signals PS, toward the front side, compared to the configuration in which electrodes are arranged on the front side of the common electrodes 34.

The description now returns to FIG. 1. The control device 24 may be configured as an IC, for example, and controls the display device 22 based on the control data CD and the image data DD from the host 10. The control device 24 includes a control circuit 70, the first drive circuit 72, a second drive circuit 74, and a touch detection circuit 76.

The control circuit 70 may be configured as a microcomputer, for example, and controls signal generation timings of the first drive circuit 72 and the second drive circuit 74, touch detection timings of the touch detection circuit 76, and the like.

The control circuit 70 controls the first drive circuit 72, the second drive circuit 74, and the touch detection circuit 76 such that, during a frame period (one frame period), one frame of a display image is rendered on the display device 22 and touch detection for one screen is performed at least once. The frame period may also be referred to as a vertical synchronization period. The frame period will be detailed later.

The first drive circuit 72 generates a reference clock signal under the control of the control circuit 70. The first drive circuit 72 also generates, under the control of the control circuit 70, a source signal SS in synchronization with the generated reference clock signal, based on the image data DD from the host 10. The first drive circuit 72 also generates, under the control of the control circuit 70, a gate signal GS and a pulse signal PS in synchronization with the generated reference clock signal.

The source drive circuit 72a supplies the source signals SS serially to multiple source lines in the display device 22. The first drive circuit 72 supplies the gate signals GS serially to the multiple gate lines in the display device 22. Also, the switching circuit 72*b* supplies the pulse signals PS respectively to multiple switching elements SW in the display device 22.

The first drive circuit 72 supplies the reference clock signal to the second drive circuit 74. The second drive circuit 74 generates a reference voltage VCOM, which is a predetermined fixed voltage, and a touch drive signal TX in synchronization with the reference clock signal, under the control of the control circuit 70. The touch drive signal TX may be a square wave signal, or may be a sine wave signal. Through the signal lines 36 shown in FIG. 3, the second drive circuit 74 supplies the reference voltage VCOM or the touch drive signal TX to the multiple common electrodes 34 in the entire display device 22.

The touch detection circuit 76 detects a touch by an object on the display device 22. Under the control of the control circuit 70, the touch detection circuit 76 performs detection of a touch by an object on a position corresponding to a common electrode 34, based on a touch detection signal Rx received from the common electrode 34 when the touch drive signal TX is supplied to each common electrode 34. The touch detection circuit 76 outputs touch position information of the touch position thus detected to the control circuit 70.

Based on the touch position information from the touch detection circuit 76, the control circuit 70 derives coordinate data TD of the touch position and outputs the coordinate data TD to the control device 12 in the host 10. The control device 12 performs various processes based on the coordinate data TD.

The control circuit 70 alternately repeats partial touch detection on one of multiple touch detection regions, which are also called scan blocks and configured by dividing multiple common electrodes 34 within the screen into multiple groups, and partial image display on one of multiple display regions, which are configured by dividing multiple pixels within the screen into multiple groups, so as to control the touch detection and the image display in a time division manner.

Figure 5:
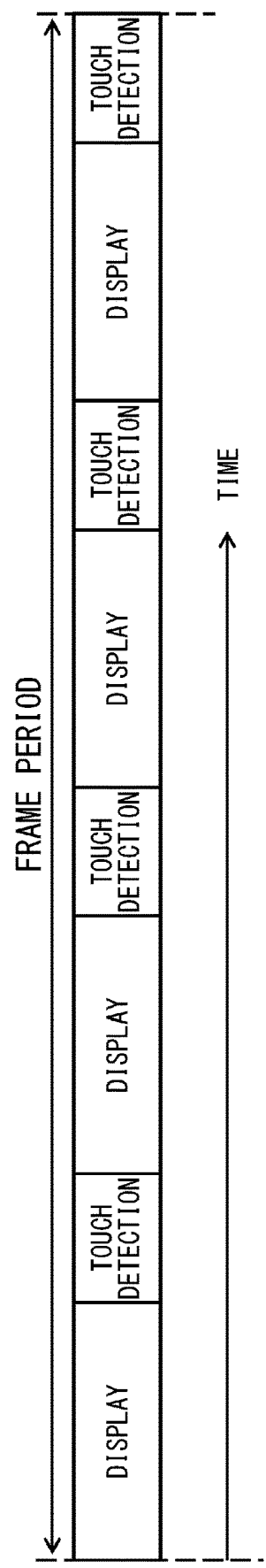
FIG. 5 is a diagram that shows an example of control timings of a control circuit shown in FIG. 1.

FIG. 5 shows an example of control timings of the control circuit 70. In the example shown in FIG. 5, within a frame period (one frame period), one image is displayed and touch detection is performed once. In the present embodiment, the display device 22 is assumed to be a display device driven at 60 Hz to display an image, so that the frame period is set to about 16.7 ($=\frac{1}{60}$) ms. Since the touch detection is performed once within a frame period, the touch detection is performed in a 60 Hz period.

In the example shown in FIG. 5, the control circuit 70 forms four display regions and also forms four touch detection regions within the screen. The four display regions may be formed by quadrisecting the screen in a vertical direction, for example. In the following, the display region at the top will be referred to as a first display region, the second display region from the top will be referred to as a second display region, the third display region from the top will be referred to as a third display region, and the bottommost display region will be referred to as a fourth display region. Meanwhile, the four touch detection regions may be formed by quadrisecting the screen in a horizontal direction, for example. In the following, the leftmost touch detection region will be referred to as a first touch detection region, the second touch detection region from the left will be referred to as a second touch detection region, the third touch detection region from the left will be referred to as a third touch detection region, and the rightmost touch detection region will be referred to as a fourth touch detection region.

The control circuit 70 controls, in a frame period, the image display on the first display region, the touch detection in the first touch detection region, the image display on the second display region, the touch detection in the second touch detection region, the image display on the third display region, the touch detection in the third touch detection region, the image display on the fourth display region, and the touch detection in the fourth touch detection region in this order.

During a period of image display, the second drive circuit 74 supplies the reference voltage VCOM to the multiple common electrodes 34. The second drive circuit 74 stops supply of the touch drive signal TX during a period of image display. Meanwhile, during a period of touch detection, the second drive circuit 74 supplies the touch drive signal TX to the multiple common electrodes 34. The second drive circuit 74 stops supply of the reference voltage VCOM during a period of touch detection.

Figure 6:
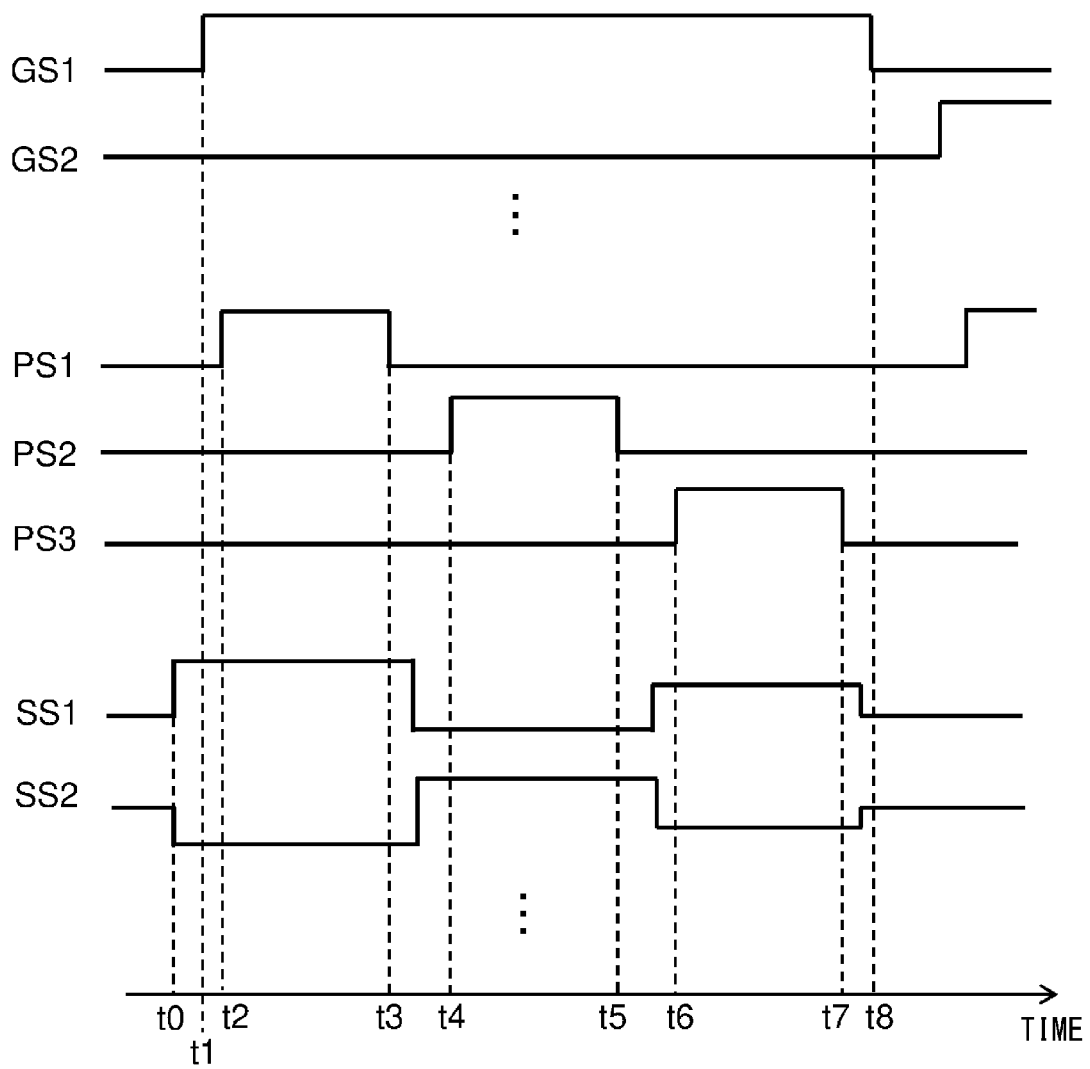
FIG. 6 is a timing diagram of each signal during an image display period of the display device shown in FIG. 2.

FIG. 6 is a timing diagram of each signal during an image display period of the display device 22 shown in FIG. 2. Each of the pulse signals PS1 through PS3 includes a pulse having a pulse width that defines ON time of the corresponding one of the multiple switching elements SW. In other words, the pulse width is equal to the ON time of the corresponding switching element SW.

At the time t0, multiple source signals SS1 and the like are set to values corresponding to the image data DD for multiple red pixels on the first row on the display device 22. At the time t1, a gate signal GS1 supplied to the gate line G1 for pixels on the first row is switched from a low level to a high level.

At the time t2, the pulse signal PS1 is switched from a low level to a high level, so that the switching element SW1 is made conductive. Accordingly, the source signal SS1 is supplied to the pixel switching element 30 connected with the gate line G1 and the source line S1, so that the pixel switching element 30 is made conductive. Thus, the pixel is displayed. Similarly, the switching elements SW4 and the like are made conductive, so that multiple pixel switching elements 30 for red pixels, including the pixel switching element 30 connected with the gate line G1 and the source line S4, are made conductive.

At the time t3, the pulse signal PS1 is switched from the high level to the low level, so that all the switching elements SW and all the pixel switching elements 30 are made non-conductive.

Thereafter, the multiple source signals are set to values corresponding to the image data DD for multiple blue pixels on the first row. After the setting of the source signals, at the time t4, the pulse signal PS2 is switched from a low level to a high level, so that the switching elements SW2, SW5, and the like are made conductive. Accordingly, the source signals SS are supplied to multiple pixel switching elements 30 for blue pixels, including the pixel switching element 30 connected with the gate line G1 and the source line S2, so that the pixel switching elements 30 are made conductive.

At the time t5, the pulse signal PS2 is switched to the low level, so that all the switching elements SW and all the pixel switching elements 30 are made non-conductive.

Thereafter, the multiple source signals are set to values corresponding to the image data DD for multiple green pixels on the first row. After the setting of the source signals, at the time t6, the pulse signal PS3 is switched from a low level to a high level, so that the switching elements SW3, SW6, and the like are made conductive. Accordingly, the source signals SS are supplied to multiple pixel switching elements 30 for green pixels, including the pixel switching element 30 connected with the gate line G1 and the source line S3, so that the pixel switching elements 30 are made conductive.

At the time t7, the pulse signal PS3 is switched to the low level, so that all the switching elements SW and all the pixel switching elements 30 are made non-conductive. Thus, the display of all the pixels on the first row is completed.

At the time t8, the gate signal GS1 is switched from the high level to the low level. The period from the time t1 to the time t8 is a horizontal synchronization period (1H). After the time t8, a gate signal GS2 supplied to the gate line G2 for pixels on the second row is switched from a low level to a high level. Thereafter, the control as described above is similarly performed, and the image of one screen is displayed in four image display periods.

Each of the pulse signals PS1 through PS3 is switched to the high level in a different period. The frequency of each of the pulse signals PS1 through PS3 is equal to the horizontal synchronization frequency. The phases of the pulse signals PS1 through PS3 are different from one another.

The description now returns to FIG. 1. The control device 12 of the host 10 includes a control unit 90, a frequency acquirer 92, a level acquirer 94, and a determination unit 96.

The control unit 90 controls the receiver 14 and outputs, to the frequency acquirer 92, reception frequency of a wireless signal received at the receiver 14. For example, the control unit 90 may activate a radio receiving function of the receiver 14 in response to a user's operation, control the reception frequency of the receiver 14 to a frequency selected by the user, and output the reception frequency. The control unit 90 may also activate a GPS receiving function in response to a user's operation and output the reception frequency for the GPS. The control unit 90 may also activate a Bluetooth function in response to a user's operation and output the reception frequency for Bluetooth.

The frequency acquirer 92 acquires the reception frequency output from the control unit 90 and outputs the reception frequency thus acquired to the level acquirer 94. The reception frequency is higher than the frequencies of the pulse signals PS, and may be a frequency in a range from a hundred kHz to several GHz, for example.

Based on the reception frequency acquired by the frequency acquirer 92, the level acquirer 94 acquires a level of a frequency component at the reception frequency included in the pulse signals PS and outputs the level thus acquired to the determination unit 96. The level of the frequency component at the reception frequency may include a level of a frequency component in a predetermined frequency band around the reception frequency, such as a reception frequency band. The level acquirer 94 performs Fourier transform on the waveform data of the pulse signals PS for at least one cycle and, based on the obtained results, acquires the level of the frequency component at the reception frequency. The waveform data of the pulse signals PS are not data of the voltage waveform actually supplied to the display device 22 but the numerical data defined by the pulse widths, cycles, and pulse amplitude, for example. The waveform data of the pulse signals PS may be stored in advance in a storage unit, which is not illustrated, or may be generated by the level acquirer 94 based on information including the pulse widths, for example. The waveform data of the pulse signals PS may be generated based on voltage waveforms actually supplied to the display device 22.

Based on the reception frequency acquired by the frequency acquirer 92, the determination unit 96 determines the pulse widths of the pulse signals PS. When the level of the frequency component at the reception frequency acquired by the level acquirer 94 is smaller than a predetermined threshold, the determination unit 96 does not change the pulse widths of the pulse signals PS and sets the values of that time as the pulse widths. The threshold may be appropriately determined through experiments and simulations such that, when the acquired level is smaller than the threshold, the noise radiated by the display device 22 does not affect the reception performed by the receiver 14.

When the acquired level is greater than or equal to the threshold, the determination unit 96 determines the pulse widths of the pulse signals PS such that the level of the frequency component at the reception frequency becomes smaller than the threshold. The frequencies of the pulse signals PS are not changed. Accordingly, it can also be said that the determination unit 96 changes the duty ratios of the pulse signals PS.

Figure 7A:
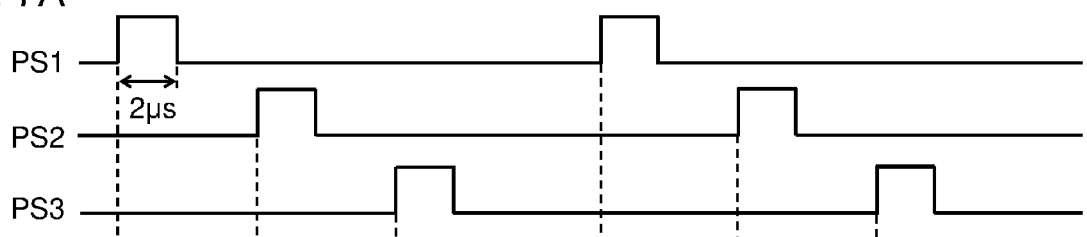
FIGS. 7A-7C are diagrams that show waveforms of pulse signals having three pulse widths.
Figure 7B:
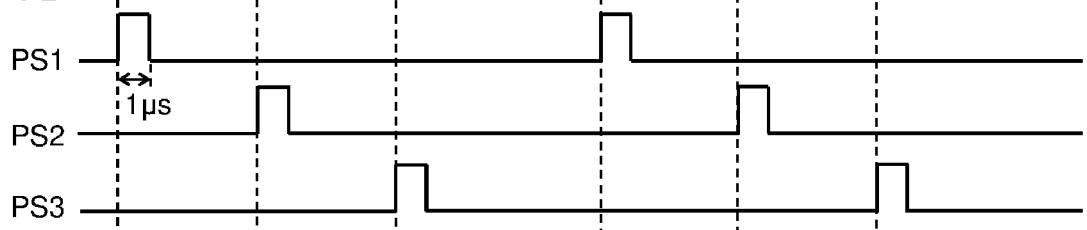
Figure 7C:
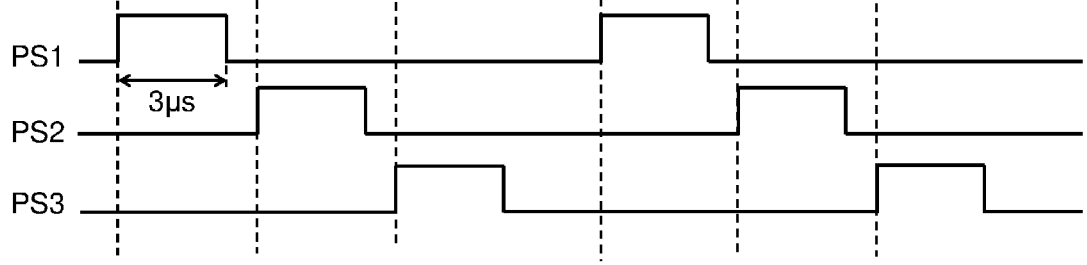
Figure 8B:
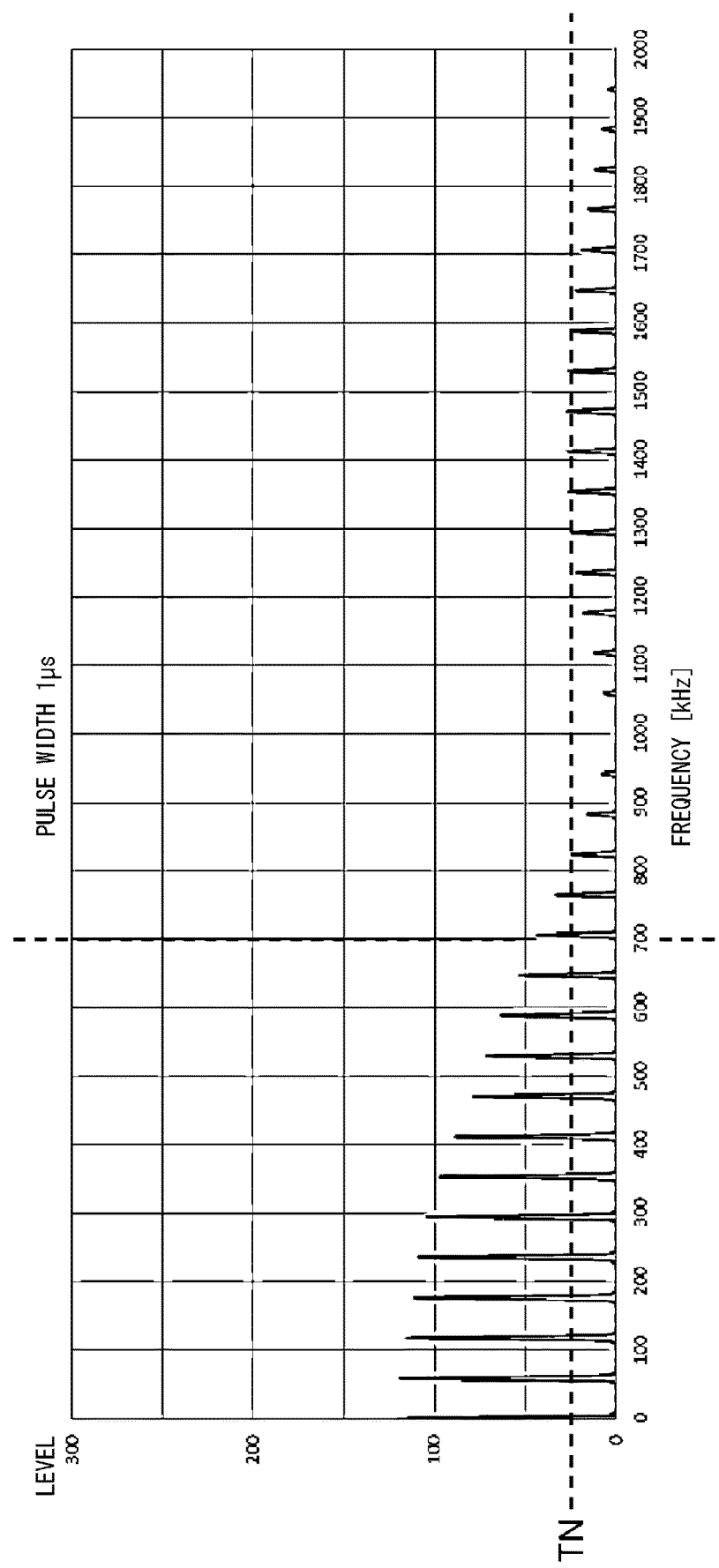
Figure 8C:
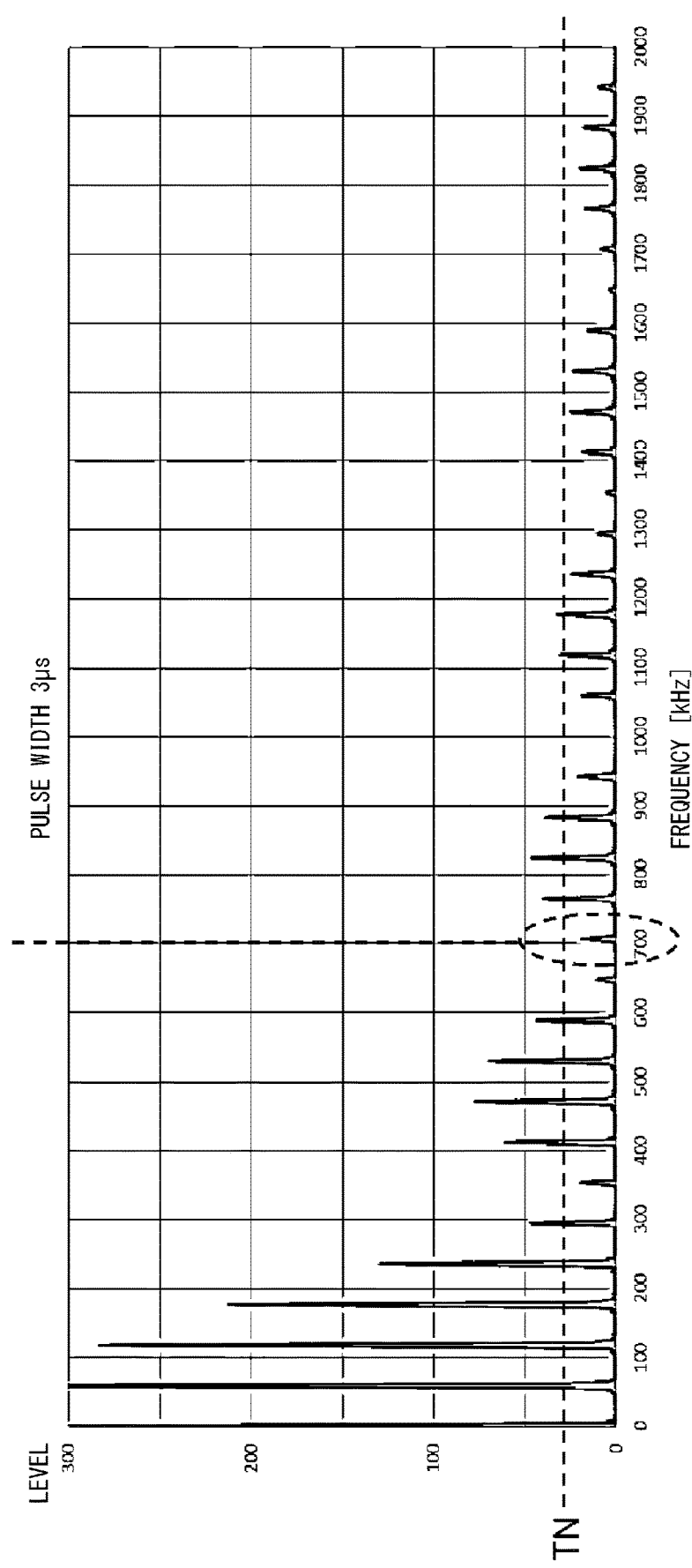

FIGS. 7A-7C show waveforms of the pulse signals PS having three pulse widths. FIGS. 8A-8C respectively show frequency components of the pulse signals PS shown in FIGS. 7A-7C. Each pulse signal PS includes a fundamental wave component and multiple harmonic components of the frequency of the pulse signal PS. When the pulse width of the pulse signal PS is changed while the frequency is fixed, the level of each of the fundamental wave component and multiple harmonic components is changed.

For example, the radio reception frequency is assumed here to be 700 kHz. Each of the frequency components at 700 kHz of the pulse signals PS having the pulse widths of 2 μs and 1 μs shown in FIGS. 8A and 8B is greater than a threshold TN. Accordingly, when the pulse width is 2 μs or 1 μs, the harmonic components at 700 kHz of the pulse signals PS radiated from the front side of the display device 22 may interfere with radio waves received at the receiver 14. This may cause mixing of noise in audio from a radio, for example.

Meanwhile, the frequency component at 700 kHz of the pulse signals PS having the pulse width of 3 μs shown in FIG. 8C is smaller than the threshold TN. Accordingly, even though the harmonic components at 700 kHz are radiated from the front side of the display device 22, interference with the radio waves received at the receiver 14 is less likely to occur.

When the acquired level is greater than or equal to the threshold, the determination unit 96 sets the pulse width of each pulse signal PS to a time that is longer than or equal to a predetermined minimum time and is shorter than or equal to a predetermined maximum time. The minimum time is set to a time longer than or equal to the charging time of a pixel electrode 32 in the display device 22. The charging time of a pixel electrode 32 is a time from when a corresponding pulse signal PS is switched to the high level until the voltage of the pixel electrode 32 reaches a predetermined proportion of the source signal. The charging time of a pixel electrode 32 is determined based on the wiring resistance of the source line, the area of the pixel electrode 32, and the like. Accordingly, the minimum time differs depending on the screen size and the number of pixels of the display device 22, for example. Since a pulse width longer than or equal to the charging time of a pixel electrode 32 is ensured, deterioration of image quality caused by a change of the pulse width can be restrained. Meanwhile, the maximum time is set in advance to a time that is shorter than one third of the horizontal synchronization period so that each of three switching elements SW supplied with a source signal in common is placed in the ON state within the horizontal synchronization period in a time-division manner. In other words, the sum of the pulse widths of the pulse signals PS (PS1, PS2, PS3) is set to a time shorter than or equal to the horizontal synchronization period. For example, in the example shown in FIGS. 7A through 7C, the minimum time may be 1 µs, and the maximum time may be 4 µs.

An example of the method for determining pulse widths will be specifically described. When the acquired level is greater than or equal to the threshold, the level acquirer 94 gradually increases the pulse width from the minimum time by a predetermined time and performs Fourier transform on the pulse signals PS having the increased pulse width, so as to serially acquire the level of the frequency component at the reception frequency included in the pulse signals PS having one of the increased pulse widths. The predetermined time may be 0.1 µs, for example, and may be appropriately determined through experiments and simulations based on the number of pixels and the like.

When the level acquirer 94 has acquired a level smaller than the threshold, the determination unit 96 sets the pulse width of each pulse signal PS to the pulse width with which the level smaller than the threshold has been acquired. When the pulse width reaches the maximum time, if the levels for the respective pulse widths acquired by the level acquirer 94 are still greater than or equal to the threshold, the determination unit 96 will set the pulse width to the pulse width with which the minimum level has been acquired. Thereafter, the determination unit 96 outputs, to the control circuit 70 of the control device 24, a pulse width change instruction including information of the pulse width thus set.

Upon reception of the pulse width change instruction, the control circuit 70 of the control device 24 allows the switching circuit 72b to generate the pulse signals PS that each have the pulse width as specified by the change instruction. Thus, the pulse widths of the pulse signals PS are changed.

The configurations of the control device 12 and the control circuit 70 can be implemented by cooperation between hardware resources and software resources or only by hardware resources. As the hardware resources, analog devices, microcomputers, DSPs, ROMs, RAMs, FPGAs, or other LSIs can be employed. As the software resources, programs, such as firmware, can be employed.

Figure 9:
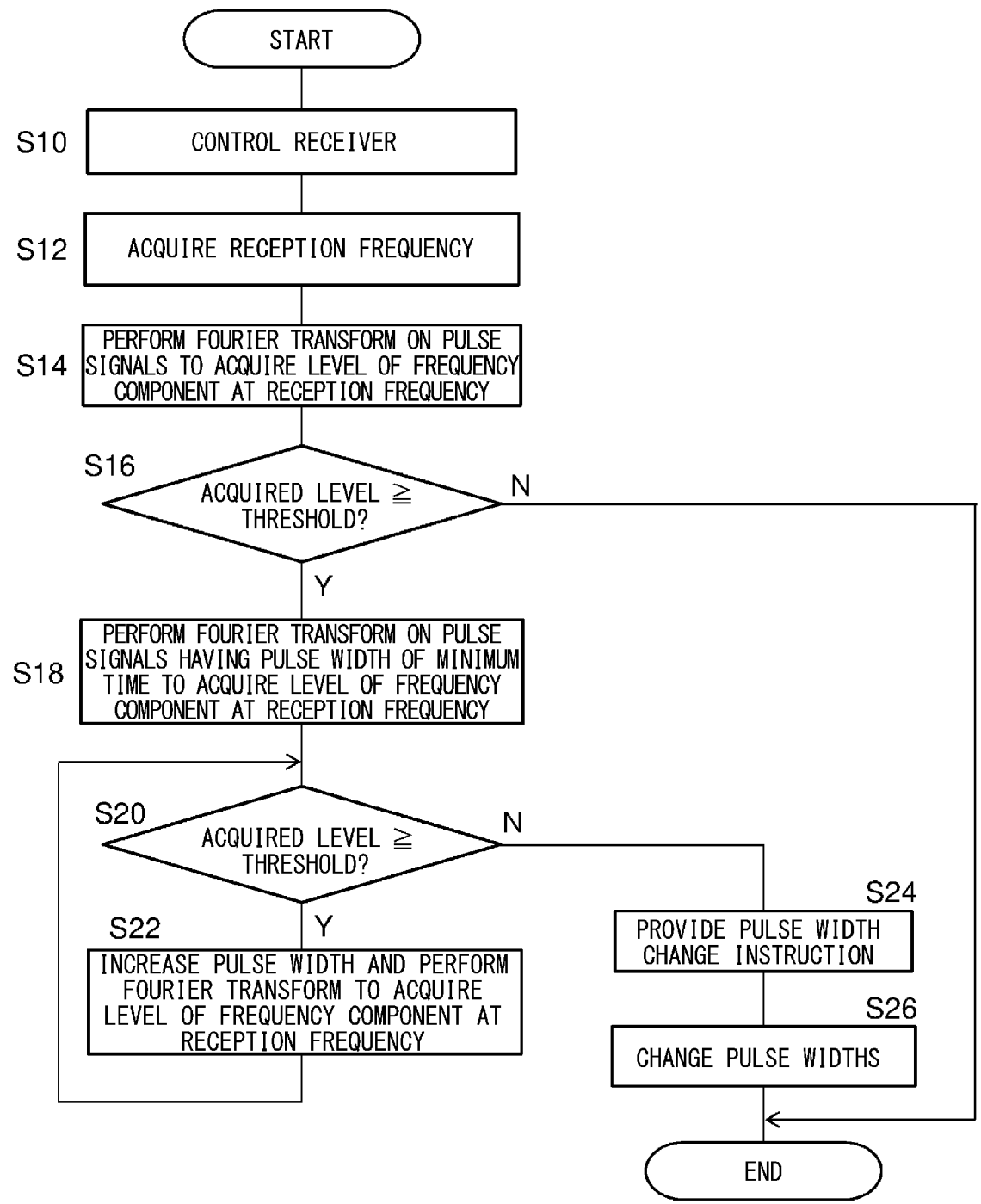
FIG. 9 is a flowchart that shows processing performed in the display system shown in FIG. 1.

There will now be described the overall operation of the display system 1 having the configuration set forth above. FIG. 9 is a flowchart that shows processing performed in the display system 1 shown in FIG. 1. The processing shown in FIG. 9 is performed each time the control unit 90 of the control device 12 controls the receiver 14.

The control unit 90 controls the receiver 14 (S10), the frequency acquirer 92 acquires the reception frequency from the control unit 90 (S12), and the level acquirer 94 performs Fourier transform on the pulse signals PS having the pulse widths at the time to acquire the level of the frequency component at the reception frequency (S14). When the acquired level is smaller than the threshold (N at S16), the processing is terminated. When the acquired level is greater than or equal to the threshold (Y at S16), the level acquirer 94 performs Fourier transform on the pulse signals PS that each have the pulse width of the minimum time to acquire the level of the frequency component at the reception frequency (S18). When the acquired level is greater than or equal to the threshold (Y at S20), the level acquirer 94 performs Fourier transform on the pulse signals PS that each have an increased pulse width to acquire the level of the frequency component at the reception frequency (S22), and the process returns to S20. When the level acquired at S20 is smaller than the threshold (N at S20), the determination unit 96 sets the pulse widths and outputs the pulse width change instruction to the control circuit 70 (S24). Accordingly, the control circuit 70 changes the pulse widths of the pulse signals PS (S26), and the processing is terminated.

According to the present embodiment, the level of the frequency component at the reception frequency included in the pulse signals PS can be changed. Accordingly, the level of the frequency component at the reception frequency included in noise caused by the pulse signals PS can be changed. Also, the pulse widths of the pulse signals PS are determined such that the level of the frequency component at the reception frequency becomes smaller than the threshold, thereby restraining the interference of harmonics of the pulse signals PS with a signal of the reception frequency without adding an electrode for shielding in the display device 22. Therefore, the reception at the receiver 14 can be made less affected, without degrading the accuracy and sensitivity of touch position detection.

Second Embodiment

The second embodiment differs from the first embodiment in that the pulse width to be set for each of multiple frequencies is determined in advance. In the following, description will be given mainly for the differences from the first embodiment.

Figure 10:
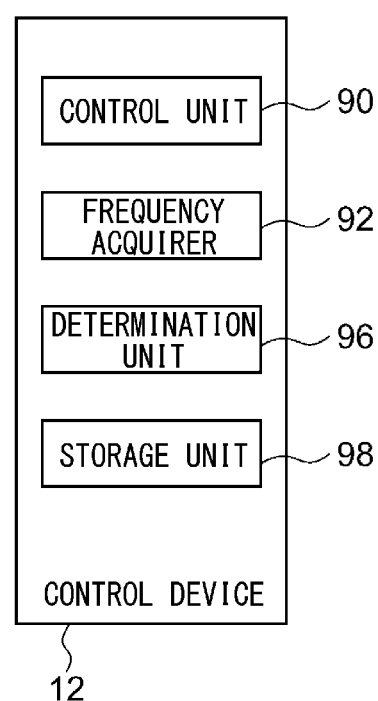
FIG. 10 is a block diagram of a control device according to a second embodiment.

FIG. 10 is a block diagram of the control device 12 according to the second embodiment. The control device 12 includes the control unit 90, the frequency acquirer 92, the determination unit 96, and a storage unit 98. The storage unit 98 stores, in relation to each of multiple frequencies receivable by the receiver 14, a pulse width with which the level of the frequency component at the frequency included in the pulse signals PS becomes smaller than or equal to the threshold, in the form of a pulse width setting table in advance. Accordingly, the multiple frequencies are related to the multiple pulse widths on a one-to-one basis. Each pulse width is determined in advance through experiments and simulations.

For example, in the case of radio reception frequency, the pulse width 3 µs is related to the reception frequency 700 kHz, and the pulse width 1 µs is related to the reception frequency 1050 kHz. Also, the pulse width 4 µs is related to the reception frequency 1250 kHz, and the pulse width 2 µs is related to the reception frequency 1400 kHz.

As shown in the aforementioned FIG. 8A, in the case of the pulse width 2 µs, the level of the frequency component at 1400 kHz is lower than the threshold TN. As shown in FIG. 8B, in the case of the pulse width 1 µs, the level of the frequency component at 1050 kHz is lower than the threshold TN. As shown in FIG. 8C, in the case of the pulse width 3 µs, the level of the frequency component at 700 kHz is lower than the threshold TN.

Figure 11:
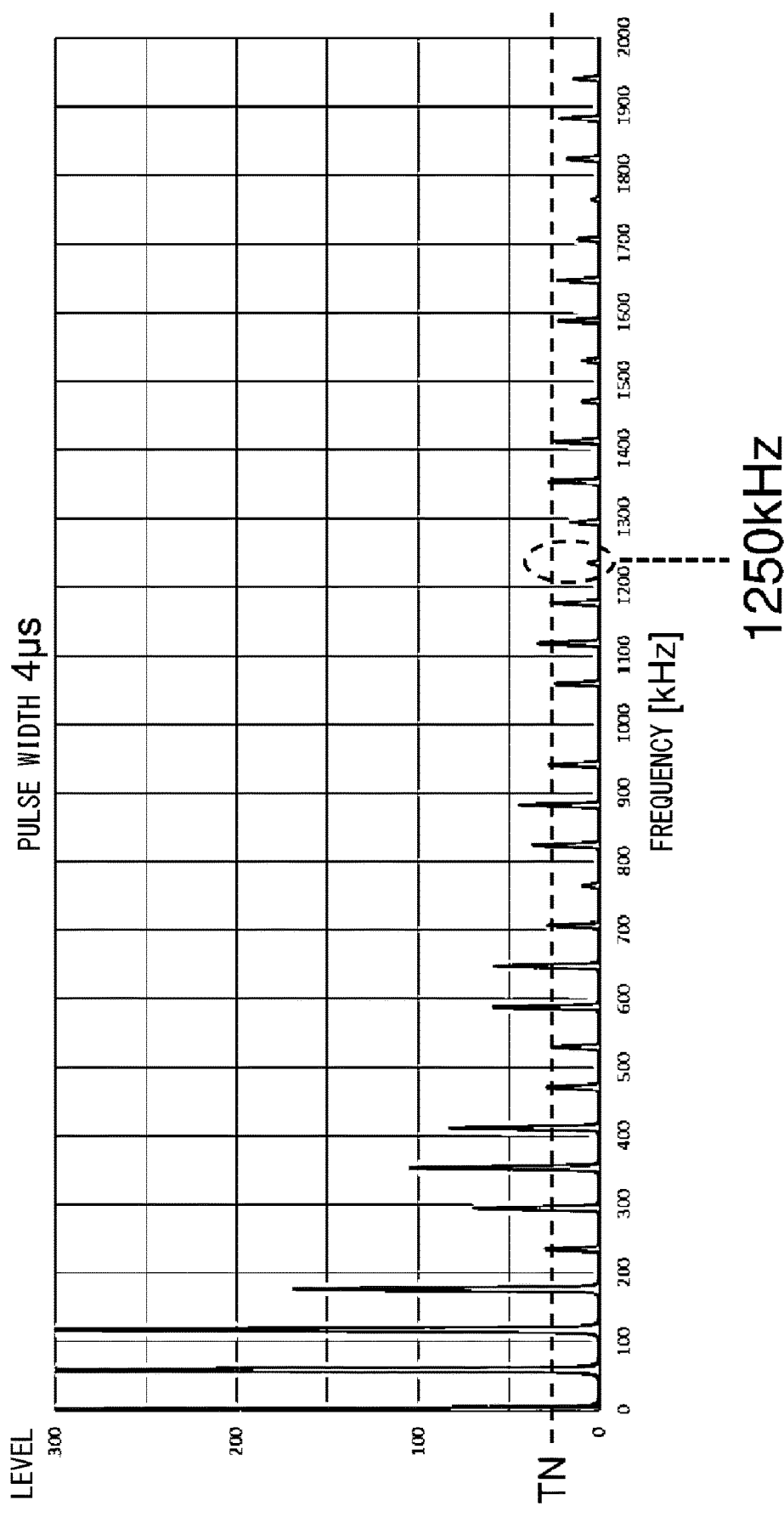
FIG. 11 is a diagram that shows frequency components of pulse signals having a pulse width of 4 μs.

FIG. 11 shows frequency components of pulse signals PS having the pulse width of 4 µs. In the case of the pulse width 4 µs, the level of the frequency component at 1250 kHz is lower than the threshold TN.

The determination unit 96 sets the pulse width of each pulse signal PS to a pulse width related to the reception frequency stored in the storage unit 98. For example, when the reception frequency acquired by the frequency acquirer 92 is 1050 kHz, the determination unit 96 sets the pulse width of each pulse signal PS to the pulse width 1 µs related to 1050 kHz. Thus, by setting the pulse width related to the reception frequency based on the table, noise at the reception frequency caused by the pulse signals PS can be reduced.

There will now be described the overall operation of the display system 1 having the configuration set forth above.

Figure 12:
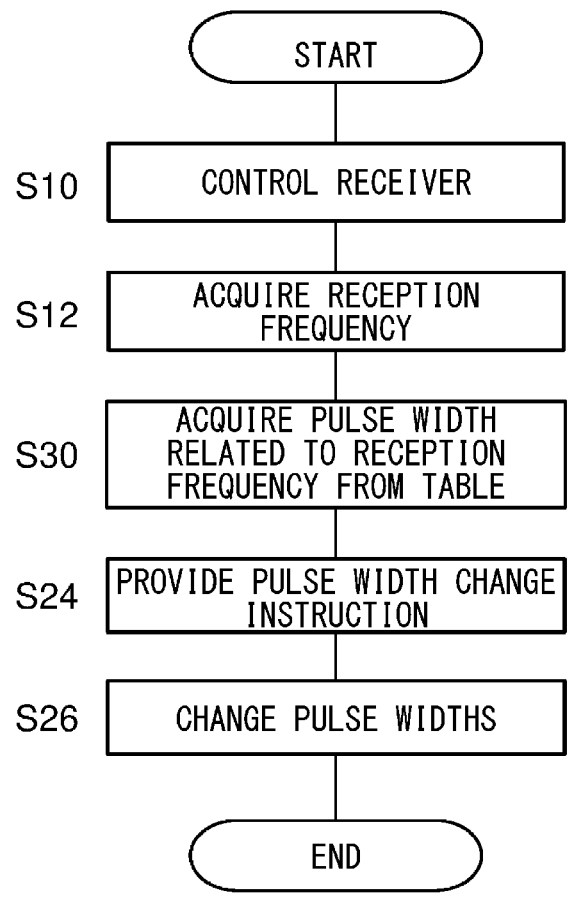
FIG. 12 is a flowchart that shows processing performed in the display system according to the second embodiment.

FIG. 12 is a flowchart that shows processing performed in the display system 1 according to the second embodiment. The processing shown in FIG. 12 is performed each time the control unit 90 of the control device 12 controls the receiver 14. The processes of S10 and S12 are identical with those in the first embodiment. After S12, the determination unit 96 acquires a pulse width related to the reception frequency from the table and sets the pulse width (S30). The subsequent processes of S24 and S26 are also identical with those in the first embodiment.

According to the present embodiment, since Fourier transform and the like is unnecessary, the processing performed in the control device 12 can be made simpler than that in the first embodiment.

The present disclosure has been described with reference to embodiments. The embodiments are intended to be illustrative only, and it will be obvious to those skilled in the art that various modifications to a combination of constituting elements or processes in the embodiments could be developed and that such modifications also fall within the scope of the present disclosure. For example, modifications may be made as described below.

In the embodiments, the multiple switching elements SW function as multiplexers that each select a source line to be supplied with a source signal, based on the three pulse signals (PS1, PS2, PS3). However, the number of pulse signals is not limited to "3". The number of pulse signals may be set to an arbitrary number N greater than or equal to 2. More specifically, the display system 1 may be designed such that the switching circuit 72b supplies N pulse signals respectively to the gates of multiple switching elements SW, and the multiple switching elements SW serially select source lines to be supplied with source signals SS based on the N pulse signals. The minimum time of each pulse width is set to a time longer than or equal to the charging time of a pixel electrode 32 in the display device 22. Also, the maximum time of each pulse width is set in advance to a time shorter than 1/N of the horizontal synchronization period so that each of the N switching elements SW supplied with a source signal in common is placed in the ON state within the horizontal synchronization period in a time-division manner. In other words, the sum of the pulse widths of the N pulse signals PS is set to a time shorter than or equal to the horizontal synchronization period.

In the embodiments, the control device 12 of the host 10 determines the pulse width, for example. However, the process may be performed by the control circuit 70 of the display module 20, instead of the control device 12. In this case, the control circuit 70 in the first embodiment includes the frequency acquirer 92, the level acquirer 94, and the determination unit 96. The control circuit 70 in the second embodiment includes the frequency acquirer 92, the determination unit 96, and the storage unit 98. This modification allows greater flexibility in the configuration of the display system 1.

In the first embodiment, when the acquired level is greater than or equal to the threshold, the level acquirer 94 may gradually decrease the pulse width from the maximum time by a predetermined time and perform Fourier transform on the pulse signals PS having each of the decreased pulse widths, so as to serially acquire the level of the frequency component at the reception frequency included in the pulse signals PS having each of the decreased pulse widths. This allows greater flexibility in the configuration of the display system 1.

Although the control device 24 is included in the display module 20 in the embodiments, the control device 24 may be included in the host 10. Also, although the first drive circuit 72 generates the reference clock signal in the embodiments, the second drive circuit 74 may generate the reference clock signal. Further, although the multiple switching elements SW1 and the like are included in the display device 22 in the embodiments, the multiple switching elements SW1 and the like may be included in the control device 24. These modifications allow greater flexibility in the configuration of the display system 1.

A display system according to one aspect of the present disclosure is as follows.

The display system includes:

a display device including multiple gate lines, multiple source lines, multiple pixel electrodes provided respectively in regions defined by the multiple gate lines and the multiple source lines, and multiple common electrodes provided to face the multiple pixel electrodes and used for both image display and touch detection;

a source drive circuit that outputs a source signal;

multiple switching elements that are respectively connected between the multiple source lines and the source drive circuit and that each output the source signal output from the source drive circuit to a source line in an ON state and each stop the output of the source signal to the source line in an OFF state;

a switching circuit that supplies multiple pulse signals to the multiple switching elements; and a control device that controls the switching circuit, for each group including multiple switching elements, the switching circuit supplies the multiple pulse signals respectively to the switching elements included in the group, and a pulse width of each of the multiple pulse signals defines ON time of the switching element supplied with the pulse signal, the control device includes a determination unit that determines pulse widths of the multiple pulse signals, and the pulse widths of the multiple pulse signals are determined such that each of the pulse widths of the multiple pulse signals is longer than or equal to a charging time of a pixel electrode and such that the sum of the pulse widths of the multiple pulse signals is shorter than or equal to a horizontal synchronization period.

According to this aspect, pulse widths of multiple pulse signals can be changeably controlled by means of the control device. Accordingly, pulse widths of multiple pulse signals can be changed such that the level of an arbitrary frequency component included in noise caused by the multiple pulse signals can be reduced. Also, when a pulse width is changed, the ON time of a switching element (i.e., the time for which a source signal is supplied to a source line) is also changed, so that the level of the frequency component included in noise caused by a source signal can also be reduced. Therefore, according to this aspect, pulse widths of multiple pulse signals can be changed for an arbitrary frequency band in which the noise level needs to be reduced, thereby reducing the level of noise in the frequency component caused by the multiple pulse signals and the level of noise in the frequency component caused by a source signal. Accordingly, without adding an electrode for shielding on the side closer to the viewer than the common electrodes, interference with signals in the frequency band can be restrained. Therefore, the signals in the frequency band can be made less affected, without degrading the accuracy and sensitivity of touch position detection.

In the display system according to the one aspect of the present disclosure, for example, the pulse widths of the multiple pulse signals may be determined such that a level of a predetermined frequency component becomes smaller than a threshold determined in advance.

In this case, the level of a predetermined frequency component included in noise caused by the multiple pulse signals is controlled to be smaller than the threshold.

In the display system according to the one aspect of the present disclosure, for example, the control device may further include a level acquirer that acquires the level of the predetermined frequency component included in the multiple pulse signals, and, when the level thus acquired is greater than or equal to the threshold, the determination unit may determine the pulse widths of the multiple pulse signals such that the level becomes smaller than the threshold.

In this case, the level of the frequency component included in the multiple pulse signals can be self-diagnosed, and the pulse widths of the multiple pulse signals can be changed such that the level becomes smaller than the threshold.

In the display system according to the one aspect of the present disclosure, for example, the control device may further include a frequency acquirer that acquires reception frequency of a receiver that receives a wireless signal, and, based on the reception frequency thus acquired, the determination unit may determine the pulse widths of the multiple pulse signals.

In this case, the level of the frequency component at the reception frequency included in the pulse signals can be changed. Therefore, the level of the frequency component at the reception frequency included in noise caused by the pulse signals can be changed, and the level of the reception frequency component included in noise caused by a source signal can also be changed.

In the display system according to the one aspect of the present disclosure, for example, the control device may include a level acquirer that acquires a level of a frequency component at the reception frequency included in the multiple pulse signals, and, when the level thus acquired is greater than or equal to a threshold determined in advance, the determination unit may determine the pulse widths of the multiple pulse signals such that the level becomes smaller than the threshold.

In this case, the level of the frequency component at the reception frequency included in the multiple pulse signals can be self-diagnosed, and the pulse widths of the multiple pulse signals can be changed such that the level becomes smaller than the threshold.

In the display system according to the one aspect of the present disclosure, for example, when the level thus acquired is greater than or equal to the threshold, the determination unit may set each of the pulse widths of the multiple pulse signals to a time longer than or equal to a minimum time determined in advance, and the minimum time may be set to a time longer than or equal to a charging time of a pixel electrode in the display device.

This case can restrain change in the image quality.

In the display system according to the one aspect of the present disclosure, for example, when the level thus acquired is greater than or equal to the threshold, the level acquirer may gradually increase the pulse width from the minimum time and serially acquire a level of a frequency component at the reception frequency included in the multiple pulse signals having one of the increased pulse widths, and, when the level smaller than the threshold has been acquired, the determination unit may set each of the pulse widths of the multiple pulse signals to the pulse width with which the level smaller than the threshold has been acquired.

In this case, since the pulse width is likely to be changed to a pulse width close to the minimum time, power consumption required when the pulse width is changed is likely to be reduced.

In the display system according to the one aspect of the present disclosure, for example, the control device may include a storage unit that stores, in relation to each of a plurality of frequencies, a pulse width with which a level of a frequency component at the frequency included in the plurality of pulse signals becomes smaller than or equal to a threshold determined in advance, and the determination unit may set each of the pulse widths of the multiple pulse signals to a pulse width related to the reception frequency stored in the storage unit.

This case can simplify the processing in the control device.

In the display system according to the one aspect of the present disclosure, for example, the control device may include a storage unit that stores, in relation to each of a plurality of frequencies, a pulse width with which a level of a frequency component at the frequency included in the plurality of pulse signals becomes smaller than or equal to a threshold determined in advance, and the determination unit may determine the pulse widths of the multiple pulse signals based on pulse widths stored in the storage unit.

This case can simplify the processing in the control device.

A control device according to one aspect of the present disclosure is a control device provided in a display system that includes: a display device including multiple gate lines, multiple source lines, multiple pixel electrodes provided respectively in regions defined by the multiple gate lines and the multiple source lines, and multiple common electrodes provided to face the multiple pixel electrodes and used for both image display and touch detection; a source drive circuit that outputs a source signal; multiple switching elements that are respectively connected between the multiple source lines and the source drive circuit and that each output the source signal output from the source drive circuit to a source line in an ON state and each stop the output of the source signal to the source line in an OFF state; and a switching circuit that supplies multiple pulse signals to the multiple switching elements, the switching circuit supplies, for each group including multiple switching elements, the multiple pulse signals respectively to the switching elements included in the group, the control device includes a determination unit that determines pulse widths of the multiple pulse signals, and the pulse widths of the multiple pulse signals are determined such that each of the pulse widths of the multiple pulse signals is longer than or equal to a charging time of a pixel electrode and such that the sum of the pulse widths of the multiple pulse signals is shorter than or equal to a horizontal synchronization period.

According to this aspect, pulse widths of multiple pulse signals can be changeably controlled by means of the control device. Therefore, pulse widths of multiple pulse signals can be changed for an arbitrary frequency band in which the noise level needs to be reduced, thereby reducing the level of noise in the frequency component caused by the multiple pulse signals and the level of noise in the frequency component caused by a source signal. Accordingly, without adding an electrode for shielding on the side closer to the viewer than the common electrodes, interference with signals in the frequency band can be restrained. Therefore, the signals in the frequency band can be made less affected, without degrading the accuracy and sensitivity of touch position detection.

A control method according to one aspect of the present disclosure is a control method used in a display system that includes: a display device including multiple gate lines, multiple source lines, multiple pixel electrodes provided respectively in regions defined by the multiple gate lines and the multiple source lines, and multiple common electrodes provided to face the multiple pixel electrodes and used for both image display and touch detection; a source drive circuit that outputs a source signal; multiple switching elements that are respectively connected between the multiple source lines and the source drive circuit and that each output the source signal output from the source drive circuit to a source line in an ON state and each stop the output of the source signal to the source line in an OFF state; and a switching circuit that supplies multiple pulse signals to the multiple switching elements, the switching circuit supplies, for each group including multiple switching elements, the multiple pulse signals respectively to the switching elements included in the group, the control method includes determining pulse widths of the multiple pulse signals, and the pulse widths of the multiple pulse signals are determined such that each of the pulse widths of the multiple pulse signals is longer than or equal to a charging time of a pixel electrode and such that the sum of the pulse widths of the multiple pulse signals is shorter than or equal to a horizontal synchronization period.

According to this aspect, pulse widths of multiple pulse signals can be changeably controlled by means of the control device. Therefore, pulse widths of multiple pulse signals can be changed for an arbitrary frequency band in which the noise level needs to be reduced, thereby reducing the level of noise in the frequency component caused by the multiple pulse signals and the level of noise in the frequency component caused by a source signal. Accordingly, without adding an electrode for shielding on the side closer to the viewer than the common electrodes, interference with signals in the frequency band can be restrained. Therefore, the signals in the frequency band can be made less affected, without degrading the accuracy and sensitivity of touch position detection.

While various embodiments have been described herein above, it is to be appreciated that various changes in form and detail may be made without departing from the spirit and scope of the invention(s) presently or hereafter claimed.

The invention claimed is:

1. A display system, comprising:
a display device comprising a plurality of gate lines, a plurality of source lines, a plurality of pixel electrodes provided respectively in regions defined by the plurality of gate lines and the plurality of source lines, and a plurality of common electrodes provided to face the plurality of pixel electrodes and used for both image display and touch detection;
a source drive circuit that outputs a source signal;
switching elements that are respectively connected between the plurality of source lines and the source drive circuit and that each output the source signal output from the source drive circuit to a source line in an ON state and each stop the output of the source signal to the source line in an OFF state;
a switching circuit that supplies a plurality of pulse signals to the switching elements; and
a CPU that controls the switching circuit, wherein,
for each group including a plurality of the switching elements, the switching circuit supplies the plurality of pulse signals respectively to the plurality of the switching elements included in the group, and a pulse width of each pulse signal of the plurality of pulse signals defines ON time of one of the plurality of the switching elements supplied with the pulse signal,
the CPU determines pulse widths of the plurality of pulse signals,
the pulse widths of the plurality of pulse signals are determined such that each of the pulse widths of the plurality of pulse signals is longer than or equal to a charging time of a pixel electrode and such that the sum of the pulse widths of the plurality of pulse signals is shorter than or equal to a horizontal synchronization period, and
the pulse widths of the plurality of pulse signals are determined such that a level of a predetermined frequency component included in the plurality of pulse signals becomes smaller than a threshold determined in advance.

2. The display system according to claim 1, wherein the CPU acquires the level, and,
when the level thus acquired is greater than or equal to the threshold, the CPU determines the pulse widths of the plurality of pulse signals such that the level becomes smaller than the threshold.

3. The display system according to claim 1, wherein the CPU acquires a reception frequency of a receiver that receives a wireless signal, and,
based on the reception frequency thus acquired, the CPU determines the pulse widths of the plurality of pulse signals.

4. The display system according to claim 3, wherein the CPU acquires the level of the predetermined frequency component at the reception frequency included in the plurality of pulse signals, and,
when the level thus acquired is greater than or equal to the threshold determined in advance, the CPU determines the pulse widths of the plurality of pulse signals such that the level becomes smaller than the threshold.

5. The display system according to claim 4, wherein, when the level thus acquired is greater than or equal to the threshold, the CPU sets each of the pulse widths of the plurality of pulse signals to a time longer than or equal to a minimum time determined in advance, and
the minimum time is set to a time longer than or equal to the charging time.

6. The display system according to claim 5, wherein, when the level thus acquired is greater than or equal to the threshold, the CPU gradually increases the pulse width from the minimum time and serially acquires a second level of a second frequency component at the reception frequency included in the plurality of pulse signals having one of the increased pulse widths, and,
when the second level smaller than the threshold has been acquired, the CPU sets each of the pulse widths of the plurality of pulse signals to the increased pulse width with which the second level smaller than the threshold has been acquired.

7. The display system according to claim 3, wherein
the CPU comprises a storage unit that stores, in relation to each frequency of a plurality of frequencies, a pulse width with which a level of a frequency component at the frequency becomes smaller than or equal to the threshold determined in advance, and
the CPU sets each of the pulse widths of the plurality of pulse signals to a pulse width related to one of the plurality of frequencies stored in the storage.

8. The display system according to claim 1, wherein
the CPU comprises a storage that stores, in relation to each frequency of a plurality of frequencies, a pulse width with which a level of a frequency component at the frequency becomes smaller than or equal to the threshold determined in advance, and
the CPU determines the pulse widths of the plurality of pulse signals based on pulse widths stored in the storage.

9. A control device provided in a display system, the display system comprising: a display device comprising a plurality of gate lines, a plurality of source lines, a plurality of pixel electrodes provided respectively in regions defined by the plurality of gate lines and the plurality of source lines, and a plurality of common electrodes provided to face the plurality of pixel electrodes and used for both image display and touch detection; a source drive circuit that outputs a source signal; switching elements that are respectively connected between the plurality of source lines and the source drive circuit and that each output the source signal output from the source drive circuit to a source line in an ON state and each stop the output of the source signal to the source line in an OFF state; and a switching circuit that supplies a plurality of pulse signals to the switching elements, the switching circuit supplying, for each group including a plurality of the switching elements, the plurality of pulse signals respectively to the plurality of the switching elements included in the group, the control device comprising:
a CPU that determines pulse widths of the plurality of pulse signals, wherein
the pulse widths of the plurality of pulse signals are determined such that each of the pulse widths of the plurality of pulse signals is longer than or equal to a charging time of a pixel electrode and such that the sum of the pulse widths of the plurality of pulse signals is shorter than or equal to a horizontal synchronization period, and
the pulse widths of the plurality of pulse signals are determined such that a level of a predetermined frequency component included in the plurality of pulse signals becomes smaller than a threshold determined in advance.

10. A control method used in a display system, the display system comprising: a display device comprising a plurality of gate lines, a plurality of source lines, a plurality of pixel electrodes provided respectively in regions defined by the plurality of gate lines and the plurality of source lines, and a plurality of common electrodes provided to face the plurality of pixel electrodes and used for both image display and touch detection; a source drive circuit that outputs a source signal; switching elements that are respectively connected between the plurality of source lines and the source drive circuit and that each output the source signal output from the source drive circuit to a source line in an ON state and each stop the output of the source signal to the source line in an OFF state; and a switching circuit that supplies a plurality of pulse signals to the switching elements, the switching circuit supplying, for each group including a plurality of the switching elements, the plurality of pulse signals respectively to the plurality of the switching elements included in the group, the control method comprising:
determining, by a CPU, pulse widths of the plurality of pulse signals, wherein
the pulse widths of the plurality of pulse signals are determined such that each of the pulse widths of the plurality of pulse signals is longer than or equal to a charging time of a pixel electrode and such that the sum of the pulse widths of the plurality of pulse signals is shorter than or equal to a horizontal synchronization period, and
the pulse widths of the plurality of pulse signals are determined such that a level of a predetermined frequency component included in the plurality of pulse signals becomes smaller than a threshold determined in advance.

* * * * *